(12) United States Patent
Winter

(10) Patent No.: US 9,516,871 B1
(45) Date of Patent: Dec. 13, 2016

(54) FLOATING OR SINKING LIVE BAIT CONTAINER

(71) Applicant: Lynn A. Winter, Bloomington, MN (US)

(72) Inventor: Lynn A. Winter, Bloomington, MN (US)

( * ) Notice: Subject to any disclaimer, the term of this patent is extended or adjusted under 35 U.S.C. 154(b) by 185 days.

(21) Appl. No.: 13/986,337

(22) Filed: Apr. 22, 2013

(51) Int. Cl.
*A01K 97/05* (2006.01)

(52) U.S. Cl.
CPC ..................... *A01K 97/05* (2013.01)

(58) Field of Classification Search
CPC ................. A01K 97/04; A01K 97/05
USPC ......................................... 43/55, 56
See application file for complete search history.

(56) References Cited

U.S. PATENT DOCUMENTS

| | | | |
|---|---|---|---|
| 2,111,959 A | 3/1938 | Baxter | |
| 2,613,843 A | 10/1952 | Suda | |
| 3,009,281 A | 11/1961 | Unger | |
| 3,728,812 A * | 4/1973 | Woolworth | A01K 97/05 43/55 |
| 4,019,274 A | 4/1977 | Landell et al. | |
| 4,260,070 A | 4/1981 | Pierson | |
| 4,554,757 A | 11/1985 | Sakuta, Jr. | |
| D285,595 S | 9/1986 | Lanius | |
| 4,686,788 A | 8/1987 | Hartman | |
| 5,123,198 A | 6/1992 | Von Grossmann | |
| 5,394,639 A | 3/1995 | Tentler | |
| 5,529,204 A | 6/1996 | Sykes | |
| 6,032,404 A | 3/2000 | Cincibus | |
| 6,186,662 B1 * | 2/2001 | Jackson | A45C 3/00 383/117 |
| 6,584,727 B1 | 7/2003 | De Shazer et al. | |
| 6,857,222 B1 | 2/2005 | King | |
| 7,299,585 B2 | 11/2007 | Perttu | |
| 2008/0190011 A1 | 8/2008 | Neal et al. | |
| 2010/0000142 A1 | 1/2010 | Thompson et al. | |

* cited by examiner

*Primary Examiner* — Thien Thanh Pham

(57) ABSTRACT

A live bait container having at least one air chamber to provide buoyancy. It floats upright when stationary, and it floats on its back side when trolling. There is a strategically placed opening through the back or side wall of the air chamber to selectively allow air or water to enter and be trapped within the chamber. During fishing, air will remain trapped inside of the air chamber; however, when the user wants to store the container below the surface, air can be allowed to escape through the opening in the chamber by simply pushing the container below the water surface with its back side up. Air will escape the chamber to allow the container to submerge. To regain buoyancy, the user removes the container from the water and places it in a generally upright position, and the water will run out as air enters through the air chamber opening.

8 Claims, 2 Drawing Sheets

FLOATING OR SINKING LIVE BAIT CONTAINER

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to containers suitable for retaining live fishing bait such as minnows, leaches, crawfish and other aquatic organisms.

BACKGROUND OF THE INVENTION

Sport fishermen often find it advantageous to use live bait as well as artificial lures for successful angling. Live bait containers are designed to maintain the bait in a lively, healthy condition for optimum results. These containers generally have numerous small openings or holes to facilitate the constant free exchange of container water with outside fresh water in order to maintain a relatively constant water temperature and to renew the oxygen as it is gradually used by the bait inside of the container. Live bait containers for aquatic organisms, such as minnows, leaches, and crawfish are usually designed with sufficient buoyancy to remain afloat at the water surface with the major portion of the container submerged in order to provide ready access to the bait while keeping the bait submerged below the water surface. This allows the exchange of water between the water inside of the container and the lake or river water outside of the container, thus keeping the bait alive. A live bait container or "minnow bucket" is also generally configured to facilitate floating behind or alongside a boat with its access opening facing upward to allow easy access to the bait while trolling.

Most of these floating live bait containers have a major disadvantage. There are many situations when it is desirable to completely submerge the container well below the water surface for long periods of time between fishing activities in order to remove the container from the buffeting action of large waves and the wake from boat traffic. This buffeting action is harmful to and damaging to bait. The bait container may be tethered to a dock or stationery boat for stowage for long intervals between periods of fishing. During these intervals, there will be considerably less injury to the bait if the container is submerged well below the buffeting action of the waves. Because the amount of floatation is generally not adjustable, fishermen sometimes make-do by gathering some rocks or other dense material to place inside of the container to completely submerge it. Then, when fishing resumes, the rocks are removed so the container can resume floating in its normal orientation to provide easy access to the bait while fishing. Another advantage of stowing the container below the water surface is that the temperature and oxygen levels below the water surface are usually better than the surface conditions for maintaining the health and viability of the bait. Water below the surface is typically cooler and has higher oxygen content than surface water.

In order to overcome this disadvantage and allow the bait container to be selectively submerged, Sykes U.S. Pat. No. 5,529,204 discloses a minnow bucket having air chambers, each air chamber comprising two holes, and each hole having a matching stopper or plug. These plugs can be temporarily removed to allow filling the air chambers with water or dense material to increase the density of the bucket and allow it to sink below the water surface where the water temperature and oxygen level are more conducive to maintaining the live bait in a lively, healthy condition, and where the bait is not subject to injury from the buffeting action of the surface waves. The disadvantage in this arrangement is that two openings, each having a plug or stopcock are required for each air chamber. While this method of temporarily increasing the weight and density of the unit in order to submerge it is workable, a simpler, less cumbersome, easy to use method of alternating from floating to sinking, and then back to floating is highly desirable.

The present invention provides a significant improvement in the simplicity, capability and ease of alternating between floating and sinking of the bait container for aquatic live baits.

BRIEF SUMMARY OF THE INVENTION

What is needed by fishermen is a live bait container to confine bait, such as minnows, leaches or crawfish that meets the following objectives:
(a) To provide a live bait container that permits the constant free exchange of water between the water inside of the container and outside fresh water.
(b) A live bait container that allows easy insertion and extraction of bait by the user.
(c) A live bait container that has sufficient buoyancy to normally float at the water surface during fishing activity, but can simply and easily be converted to a sinking live bait container by easily reducing its buoyancy for stowage below the buffeting action of waves and where the water temperature is cooler and oxygen levels are higher to maintain the bait in a lively, healthy condition.
(d) A live bait container that, conversely, can simply and easily be adjusted to regain its buoyancy and return to a floating position at the water surface.
(e) A live bait container that provides the angler with easy access to the bait when the container is floating in the upright position or floating on its back wall while trolling.
(f) A live bait container that can be tethered to a dock or boat, either while floating or submerged.
(g) A live bait container that is simple and easy to manufacture using common, inexpensive technology and materials.

This invention is a live bait container used to confine and transport live bait such as minnows, leaches or crawfish for fishermen. The live bait container has perforations or holes to allow the constant free exchange of water between the water inside of the live bait container and the fresh outside water to maintain a favorable environment to keep the bait healthy and lively. It also comprises an access door and a bait enclosure with at least one air chamber to provide buoyancy to float the live bait container in an upright position at the water surface with the major portion of the container below the water surface. It remains in this upright position when the bait container is stationary. There is a weight fixedly attached inside at the bottom of the bait enclosure near the back wall of the enclosure to maintain the container in an upright posture when it is stationery. However, when the container is being towed behind or beside a boat during trolling, this weight in combination with the air chamber and the tension of the tether will cause the container to float with its front wall and access door facing upward. The access door is sized and shaped to accommodate the users hand for convenient insertion or removal of bait. The access door of the live bait container has a spring-biased hinge to keep the door closed during normal fishing activity to confine the live bait.

Typically, there will be two longitudinally positioned air chambers, one integrally formed with the bait enclosure, along each side of the bait enclosure. These air chambers are airtight, except each has a strategically placed hole or opening located near the bottom of the air chamber and passing through the back wall or side wall of the air chamber. This opening is provided to selectively allow air to be entered into the air chamber to provide floatation, or for water to be entered into the air chamber to submerge the live bait container. When the angler wants the live bait container to submerge, he/she pushes the container to the position shown in FIG. 4 whereby air will escape the air chamber and water will enter. With the air chambers filled with water the weight and density of the live bait container will be increased and it will submerge. When the user wishes to replace the water in the air chamber with air, he/she removes the live bait container from the water and places it in a generally upright position, and the water will then run out through the air chamber opening and be replaced with air to increase the buoyancy to allow the container to float. This air will be trapped within the air chamber until the angler wishes to submerge the live bait container.

The live bait container has a handle, a rope, cord, or chain tether for attaching the container to a dock or boat. The container is preferably made from plastic or other suitable materials.

The advantages of the invention are:
(a) The live bait container and the smaller inner bait container have numerous holes to provide for the constant free exchange of water between the water inside of the containers and the outside fresh water.
(b) The live bait container has an access door with a spring-biased hinge to allow easy insertion and extraction of bait by the angler.
(c) The bait container has sufficient buoyancy to remain afloat at the water surface during fishing activity, but can simply and easily be converted to sink by easily reducing the buoyancy for stowage below the buffeting action of waves and where the water temperature is cooler and the oxygen level is higher to maintain the bait in a lively, healthy condition. Thus, the bait container can be submerged without the angler having to gather rocks or other dense material to add weight and density to sink the container.
(d) The container can simply and easily regain its buoyancy to return to a floating position by removing it from the water and placing it in an upright position so air will reenter to provide floatation.
(e) The container provides the angler with easy access to the bait through the access door opening of the live bait container during fishing activity.
(f) The live bait container has a tether so it can be secured to a dock or boat.
(g) The container is simple and easy to manufacture using common inexpensive technology and materials.

These and other objects, features, aspects, and advantages of the invention will become better appreciated and more clearly understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit and scope thereof, and the embodiments of the invention are intended to include all such modifications.

DRAWING REFERENCE NUMERALS OF THE ELEMENTS

| Element | | Element | |
|---|---|---|---|
| 10 | container | 36 | air chamber |
| 12 | handle | 38 | air chamber top wall |
| 14 | bait enclosure | 40 | air chamber front wall |
| 16 | top wall | 42 | air chamber side wall |
| 18 | front wall | 44 | air chamber back wall |
| 20 | side wall | 46 | air chamber bottom wall |
| 22 | back wall | 48 | air chamber opening |
| 24 | bottom wall | 50 | weight |
| 26 | holes | 52 | container tether |
| 28 | access opening | 54 | access opening top edge |
| 30 | access door | 56 | access door top edge |
| 32 | spring-biased hinge | 58 | access door bottom edge |
| 34 | door catch | | |

DETAILED DESCRIPTION OF THE INVENTION

The examples used herein are intended merely to facilitate an understanding of the ways in which the various embodiments of the invention may be practiced and to further enable those having skill in the art to practice the concepts of the invention. Accordingly, the examples given should not be construed as limiting the scope of the invention.

Figure 1:
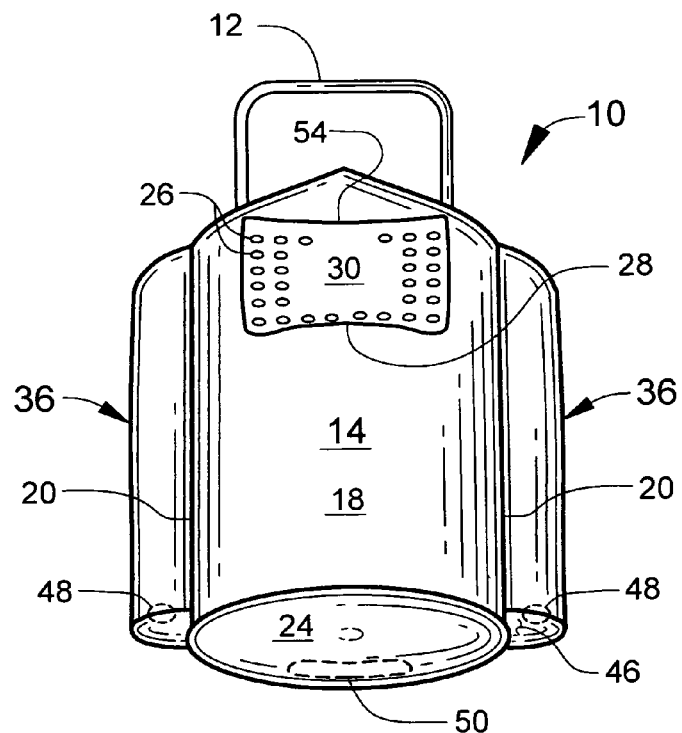
FIG. 1 illustrates a perspective view of the front and bottom of the live bait container in a preferred form.

In describing the invention, expressions such as "top," "bottom," and "side," refer to the position when the live bait container 10 is in its generally upright or vertical attitude. With reference to the drawings, and wherein like numerals designate like parts, FIG. 1 illustrates a live container 10 primarily for maintaining aquatic live fishing bait, such as minnows, leaches or crawfish in a lively, healthy condition during fishing activity or during intervals of stowage between fishing activities. Container 10 may also be used to contain non-aquatic bait. Container 10 comprises a handle 12, a bait housing or enclosure 14 adapted to prevent the bait from escaping, at least one air chamber 36 to provide variable buoyancy, an access door 30, normally urged in a closed position by a spring-biased hinge 32, a bait container access opening 28, a permanently affixed weight 50 to facilitate the correct floating orientation of container 10 during trolling, and a container tether 52.

Figure 5:
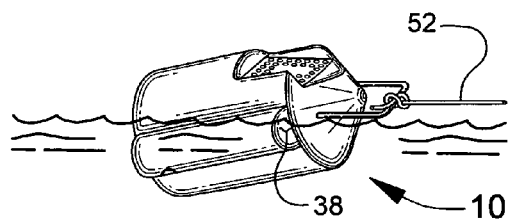
FIG. 5 is a perspective view of the invention in a floating position while trolling.
Figure 6:
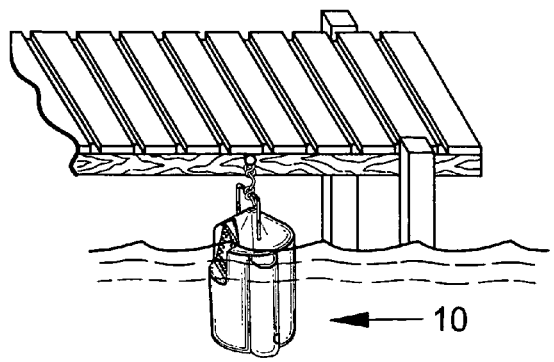
FIG. 6 is a perspective view of the invention in a normal upright floating position.
Figure 7:
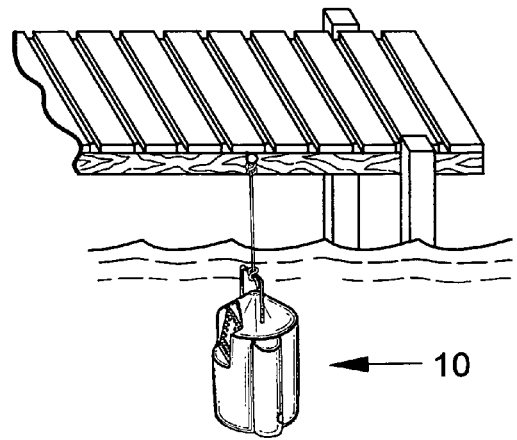
FIG. 7 is a perspective view of the invention in a submerged position.
Figure 4:
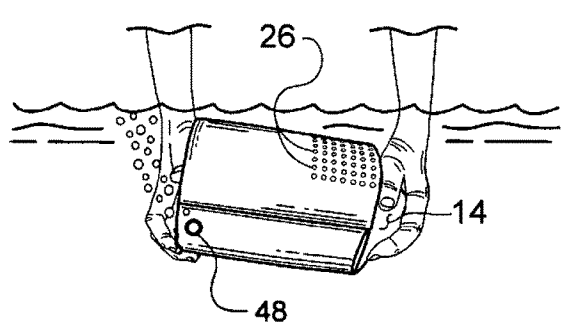
Figure 5:
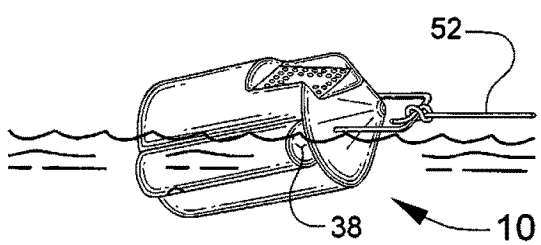
Figure 6:
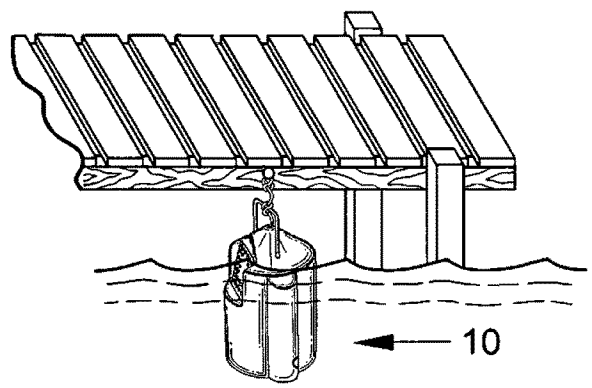
Figure 7:
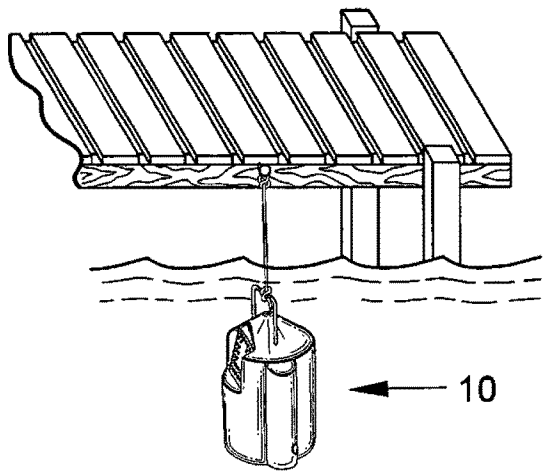

Handle 12 is typically configured in an inverted U-shape and sized to be conveniently gripped by the user to lift or carry container 10. It can also be used as a connection point to anchor or tow container 10 as shown in FIGS. 5, 6 and 7. It can be made of plastic or similar suitable materials, and can be designed to be retractable for the purpose of minimizing space. Enclosure 14 comprises a generally conical shaped top wall 16, a front wall 18, at least one side wall 20, a back wall 22, a generally flat bottom wall 24, and an access opening 28, all integrally formed to provide an escape-proof bait enclosure for the live bait. The function of walls 16, 18, 20, 22, and 24 is to define the hollow bait enclosure 14. Bait enclosure 14, with its elements, is preferably integrally formed and molded from plastic or made from other similar suitable materials, such as fiberglass, metal or carbon. The upper and lower portions of bait enclosure 14 can be formed in relatively simple molds and joined together along a sealing seam. Bait enclosure 14 may be frustoconical, cylindrical, rectangular, or one of a number of different shapes. Access opening 28 and its matching access door 30 are positioned in bait enclosure front wall 18 near the top of bait enclosure 14 and are sized and shaped to facilitate convenient access for a user to insert his/her hand to insert or retrieve bait.

Access door 30 is attached at access door top edge 56 to access opining top edge 54 of access opening 28 by spring-biased hinge 32, and is normally held in a closed position by spring-biased hinge 32 to confine the bait. Access door 30, in its closed position, serves as a barrier to prevent the bait from escaping from bait enclosure 14. Access door 30 is preferably made from plastic or other suitable materials and may have water portals or holes 26 to enhance the free exchange of water between the water inside of bait enclosure 14 and outside fresh water. Holes 26 are sufficiently small to confine the bait, but large enough to provide the constant free exchange of water. Holes 26 also allow the outflow of excess water when container 10 is removed from the water body.

It can be seen from FIG. 1 that container 10 is adapted to contain a volume of water even when stored outside of the water body. Holes 26 may be provided in the walls 18, 20, and 22 of bait enclosure 14. Spring-biased hinge 32 is made of steel or other suitable material with a spring sufficiently strong to maintain the access door in a normally closed position, yet allow the user to easily push access door 30 open to insert a hand to extract bait. A latch or door catch 34 is provided as an inward projection or stud fixedly attached to the inside of bait enclosure back wall 22 of bait enclosure 14. It is provided so the user can easily open access door 30 by hand and frictionally engage access door bottom edge 58 of access door 30 against the top surface of door catch 34 to temporarily hold access door 30 in the open position. Access door 30 will remain held in the open position until the user pulls access door 30 away from door catch 34 to allow spring-biased hinge 32 to reclose access door 30 to confine the bait. In this manner, access door 30 can be conveniently kept open while live bait is being entered into bait enclosure 14. When the angler wants to release door 30 to allow spring-biased hinge 32 to reclose the door, he/she pulls the lower edge of the door away from door catch 34, and access door 30 will close and remain in a closed position until urged open again by the angler. Door catch 34 is preferably formed of the same material as bait enclosure 14.

A weight 50 is permanently affixed to bait enclosure bottom wall near bait enclosure back wall 22 inside of bait enclosure 14. Weight 50 is composed of metal or other dense material having a specific gravity of greater than 1, and is sized and positioned to hold container 10 in a substantially upright position when floating stationary as shown in FIGS. 6 and 7, but allow container 10 to reside in a nearly horizontal position with access door 30 facing upward when towed by container tether 52 during trolling activity as shown in FIG. 5. Container tether 52 is a rope, cord or chain of nylon, plastic, hemp, metal or other suitable material of sufficient strength and durability to tow or suspend container 10 during fishing activity or when container 10 is suspended.

One or more longitudinally positioned air chambers 36 is arranged to provide sufficient buoyancy to maintain container 10 in its normal upright position afloat at the water surface while the major portion of container 10 is submerged. Typically, air chamber 36 is made of the same plastic or similar material as bait enclosure 14 and is molded and integrally formed with bait enclosure 14. Air chamber 36 comprises air chamber top wall 38, air chamber front wall 40, at least one air chamber side wall 42, air chamber back wall 44, air chamber bottom wall 46, and air chamber opening 48. The function of walls 38, 40, 42, and 44 is to define a hollow air chamber 36. Air chamber 36 is a hollow, longitudinally positioned, airtight enclosure, except for air chamber opening 48. Typically, a pair of air chambers 36 can be positioned, one alongside each side of bait enclosure 14, as shown in FIG. 1.

Air chamber opening 48 must be located close to the air chamber bottom wall 46 of air chamber 36 and go through the air chamber side wall 42 or air chamber back wall 44. When opening 48 is located in this position, air will not escape from air chamber 36 when container 10 is in any of its normal or near-normal positions shown in FIGS. 5, 6, and 7. However, air can purposely be released from air chamber 36 by the user by placing container 10 in the forced unstable position shown in FIG. 4, causing air to be expelled through air chamber opening 48, and out of air chamber 36, thus allowing water to enter to cause the total weight and density of container 10 to increase sufficiently to cause container 10 to sink.

When the user desires to regain buoyancy, the user can remove container 10 from the water body and place it in a generally upright position, and the water in air chamber 36 will simply run out of air chamber 36 through opening 48. Water will not reenter air chamber 36 unless the user again forces the air out of air chamber 36 by pushing live bait container 10 into the position shown on FIG. 4. For suitable performance, air chamber opening 48 should be a hole in the range of approximately ⅜ inch to 1¼ inch in diameter. Opening 48 can also be non-circular of similar area. This simple addition of only one air chamber opening 48, strategically placed on each air chamber 36, allows the angler to selectively alternate between a floating or sinking container 10 with very little effort.

Operation and Use of the Invention

Figure 4:
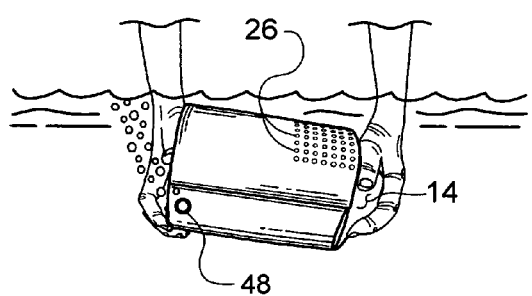
FIG. 4 is a perspective view of the invention with an air chamber being filled with water.

Container 10 has sufficient buoyancy to float during normal fishing activity, but can be selectively made to sink by forcing it into an unstable position as shown in FIG. 4 to allow air to escape to decrease its buoyancy. Container 10 normally floats in its upright position as shown in FIG. 6 or with bait enclosure front wall 18 and access door 30 facing upward during trolling as shown in FIG. 5. During trolling, container 10 will float with bait enclosure front wall 18 facing upward because of the positioning of weight 50 at the bottom of bait enclosure 14 and near the bait enclosure back wall. The user can remove air from air chamber 36 by forcing live bait container 10 into a submerged position with bait enclosure back wall 22 and air chamber opening 48 facing upward as shown in FIG. 4, allowing air chamber 36 to release air and take on water, thus allowing container 10 to submerge. When the user chooses to regain buoyancy, he/she can simply remove container 10 from the water body and place it in a generally upright position, and the water will run out of air chamber 36 through air chamber opening 48. Water will not reenter air chamber 36 unless the user chooses to add water by placing container 10 into the position shown in FIG. 4.

CONCLUSION

It should be understood that the phraseology or terminology employed herein is for purposes of description and not of limitation. Workers skilled in the art will recognize additions, deletions, and other modifications that can be made in form and detail without departing from the spirit and scope of the invention. Thus, the scope of the invention should be determined by the appended claims, and not by the specific examples given.

From the above-described features, it can be seen that this invention is unique and has a number of significant advantages over the prior art. It is inexpensive to manufacture, simple, and easy to use. A user can easily convert it from a floating container to a sinking container by simply placing the unit in a particular position to allow air to escape the air chamber. Conversely, it can be returned to a floating unit by removing the container from the water body and placing it in a generally upright position so the water will run out through the air chamber opening in the air chamber back wall. Only one air chamber opening is required in each air chamber, and plugs or stoppers are not required to open or close the opening in the air chamber side wall or back wall. With this convenient feature, the angler can easily submerge the container to avoid the buffeting action of waves, and place the container below the water surface where temperature and oxygen levels are more favorable to maintain the bait in a lively, healthy environment. When the angler wants to resume fishing, he/she can easily return the container's buoyancy by allowing the water to run out of the air chamber. Clearly, this invention is well adapted to meet the conditions of practical use, and it should be evident that it provides many advantages, is novel, and is worthy of patentable merit over the prior art.

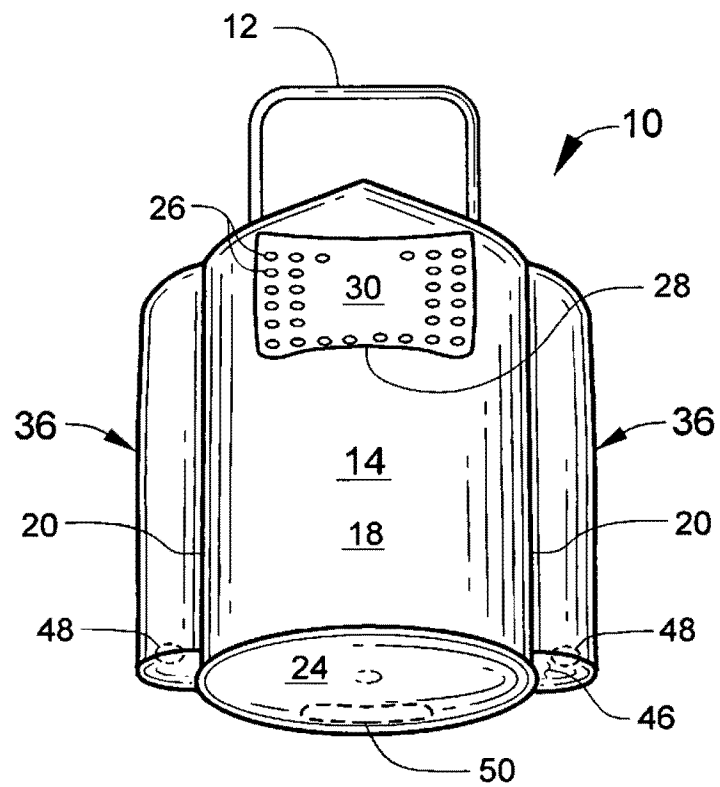
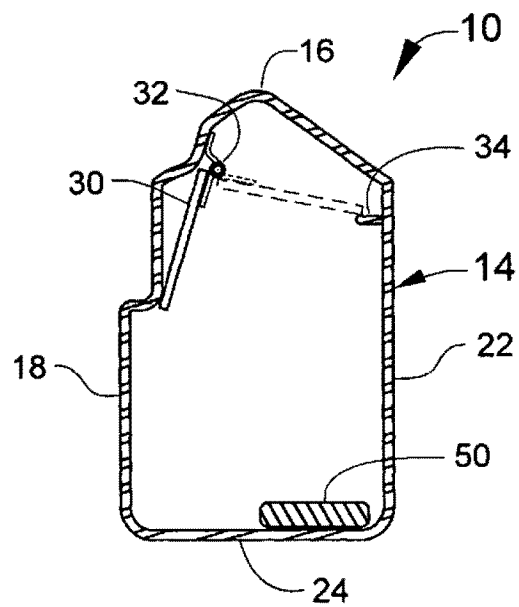
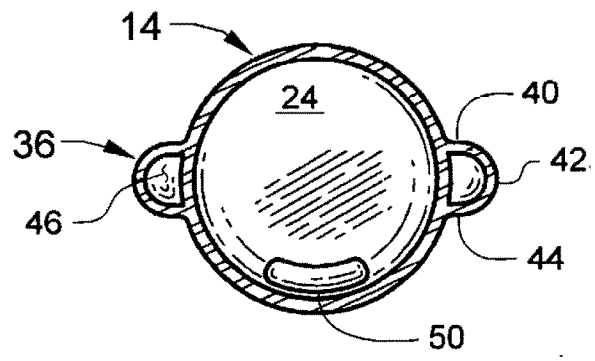

The invention claimed is:

1. A container for retaining and transporting live bait comprising: a bait enclosure having
    a top wall, a front wall, at least one side wall, a back wall, a bottom wall;
    an access opening through said front wall, said access opening having an access opening top edge, a normally closed access door (30) fitted to said access opening, said access door having an access door top edge and an access door bottom edge, said access door selectively opening for insertion and removal of live bait, and selectively closing to prevent the escape of live bait through said access opening;
    at least one external hollow air chamber to be filled with a selected variable combination of air and water to regulate an amount of buoyancy of said container; said air chamber having an air chamber top wall, at least one air chamber side wall, an air chamber bottom wall, an air chamber back wall; said at least one air chamber side wall is attached to said at least one side wall of the bait enclosure;
    said air chamber back wall comprises an opening positioned near said air chamber bottom wall and passing through said air chamber back wall, said opening being in the range of approximately ⅜ inch to 1¼ inch in diameter, said opening allows a preselected amount of air to be released from said air chamber and allows a preselected amount of water to enter said air chamber to be held therein for regulating proportions of air and water inside of said air chamber to increase or decrease the amount of buoyancy of said container to cause it to selectively float or sink below the water surface, said air chamber being airtight except for said opening whereby said preselected amount of air is released from said air chamber by a user pushing said container below the water surface with said back wall of said bait enclosure and said opening facing upward, whereby said preselected amount of air is reentered by removing said container from the water and placing it in a generally upright position to water to run out through said opening, said air chamber having the capability to maintain said selected variable combination of air and water at all positions of said bait enclosure except when user pushes said bait enclosure below the water surface with said back wall of said bait enclosure and said opening facing upward wherein water can enter said air chamber and except when said bait enclosure is in an upright position out of the water wherein water can exit said air chamber;
    a weight positioned inside said bait enclosure and near said back wall of said bait enclosure to maintain said container in a generally upright position when floating stationary and in a position with said access door facing generally upward when said container is floating while being towed;
    an inner container placed inside said bait enclosure, said inner container comprises at least one side wall, an inner container access opening and an inner container lid for separating bait of different sizes or types from that in said bait enclosure, said at least one side wall of the inner container comprises a plurality of inner container holes sufficiently large to for allowing free exchange of water inside of said inner container with outside water, yet small enough to prevent escape of bait from said inner container, said inner container holes being positioned such that said inner container holds water when sitting in a generally upright position; and
    a tether attached to said inner container through said normally closed access door.

2. The container of claim 1, further comprising a plurality of holes through at least one said walls of said bait enclosure sufficiently large to allow the free exchange of water inside of said bait enclosure with outside water, yet small enough to prevent the escape of bait, said holes being positioned such that said bait enclosure holds water when sitting in a generally upright position.

3. The container of claim 1, further comprising a spring-biased hinge connecting said access door top edge to said access opening top edge to maintain said access door in a normally closed position, yet allowing the user to easily urge said access door open to insert or remove bait.

4. The container of claim 1, further comprising a door catch disposed inside of said back wall of said bait enclosure and adapted to selectively engage said access door bottom edge to temporarily hold said access door in an open position.

5. The container of claim 1, wherein said inner container having the capability to float or sink depending upon an amount of said air or water proportions selected and placed inside of a portion above said plurality of inner container holes of said inner container.

6. The container of claim 2, further comprising a spring-biased hinge connecting said access door top edge to said access opening top edge to maintain said access door in a normally closed position, yet allowing the user to easily urge said access door open to insert or remove bait.

7. The container of claim 2, further comprising a door catch disposed inside of said back wall of said bait enclosure and adapted to selectively engage said access door bottom edge of said access door to temporarily hold said access door in an open position.

8. The container of claim 3, further comprising a door catch disposed inside of said back wall of said bait enclosure and adapted to selectively engage said access door bottom edge to temporarily hold said access door in an open position.

* * * * *

UNITED STATES PATENT AND TRADEMARK OFFICE
CERTIFICATE OF CORRECTION

| | | |
|---|---|---|
| PATENT NO. | : 9,516,871 B1 | Page 1 of 14 |
| APPLICATION NO. | : 13/986337 | |
| DATED | : December 13, 2016 | |
| INVENTOR(S) | : Winter | |

It is certified that error appears in the above-identified patent and that said Letters Patent is hereby corrected as shown below:

In the Drawings

Replace Drawing sheets 1 of 3 through 3 of 3 with the attached Drawing sheets 1 of 3 through 3 of 3

In the Specification

Delete Specification and Replace with attached Specification:

TITLE: Floating or Sinking Live Bait Container

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to containers suitable for retaining live fishing bait such as minnows, leaches, crawfish and other aquatic organisms.

Signed and Sealed this
Thirty-first Day of July, 2018

Andrei Iancu
*Director of the United States Patent and Trademark Office*

BACKGROUND OF THE INVENTION

Sport fishermen often find it advantageous to use live bait as well as artificial lures for successful angling. Live bait containers are designed to maintain the bait in a lively, healthy condition for optimum results. These containers generally have numerous small openings or holes to facilitate the constant free exchange of container water with outside fresh water in order to maintain a relatively constant water temperature and to renew the oxygen as it is gradually used by the bait inside of the container. Live bait containers for aquatic organisms, such as minnows, leaches, and crawfish are usually designed with sufficient buoyancy to remain afloat at the water surface with the major portion of the container submerged in order to provide ready access to the bait while keeping the bait submerged below the water surface. This allows the exchange of water between the water inside of the container and the lake or river water outside of the container, thus keeping the bait alive. A live bait container or "minnow bucket" is also generally configured to facilitate floating behind or alongside a boat with its access opening facing upward to allow easy access to the bait while trolling.

Most of these floating live bait containers have a major disadvantage. There are many situations when it is desirable to completely submerge the container well below the water surface for long periods of time between fishing activities in order to remove the container from the buffeting action of large waves and the wake from boat traffic. This buffeting action is harmful to and damaging to be bait. The bait container may be tethered to a dock or stationery boat for stowage for long intervals between periods of fishing. During these intervals, there will be considerably less injury to the bait if the container is submerged well below the buffeting action of the waves. Because the amount of floatation is generally not adjustable, fishermen sometimes make-do by gathering some rocks or other dense material to place inside of the container to completely submerge it. Then, when fishing resumes, the rocks are removed so the container can resume floating in its normal orientation to provide easy access to the bait while fishing. Another advantage of stowing the container below the water surface is that the temperature and oxygen levels below the water surface are usually better than the surface conditions for maintaining the health and viability of the bait. Water below the surface is typically cooler and has higher oxygen content than surface water.

In order to overcome this disadvantage and allow the bait container to be selectively submerged, Sykes US Pat. No. 5,529,204 discloses a minnow bucket having air chambers, each air chamber comprising two holes, and each hole having a matching stopper or plug. These plugs can be temporarily removed to allow filling the air chambers with water or dense material to increase the density of the bucket and allow it to sink below the water surface where the water temperature and oxygen level are more conducive to maintaining the live bait in a lively, healthy condition, and where the bait is not subject to injury from the buffeting action of the surface waves. The disadvantage in this arrangement is that two openings, each having a plug or stopcock are required for each air chamber. While this method of temporarily increasing the weight and density of the unit in order to submerge it is workable, a simpler, less cumbersome, easy to use method of alternating from floating to sinking, and then back to floating is highly desirable.

Another feature that is often missing from current live bait containers for aquatic organisms is providing separate compartments for various sizes and types of baits. For example, many fishermen use both minnows of various sizes and leaches. It is desirable to have a separate, smaller container for the smaller minnows and leaches which can be placed within the primary container and submerged with the primary container below the water surface during periods of stowage.

The present invention provides a significant improvement in the simplicity, capability and ease of alternating between floating and sinking of the bait container for aquatic live baits. This invention also includes an optional smaller, auxiliary container for small minnows, leaches or other live baits which can be placed within the primary container for submerged stowage when it is desirable to keep the baits in the smaller container separate from the baits in the primary container.

BRIEF SUMMARY OF THE INVENTION

What is needed by fishermen is a live bait container to confine bait, such as minnows, leaches or crawfish that meets the following objectives:
(a) To provide a live bait container that permits the constant free exchange of water between the water inside of the container and outside fresh water.
(b) A live bait container that allows easy insertion and extraction of bait by the user.
(c) A live bait container that has sufficient buoyancy to normally float at the water surface during fishing activity, but can simply and easily be converted to a sinking live bait container by easily reducing its buoyancy for stowage below the buffeting action of waves and where the water temperature is cooler and oxygen levels are higher to maintain the bait in a lively, healthy condition.
(d) A live bait container that, conversely, can simply and easily be adjusted to regain its buoyancy and return to a floating position at the water surface.
(e) A live bait container that provides the angler with easy access to the bait when the container is floating in the upright position or floating on its back wall while trolling.
(f) A live bait container having a separate smaller container unit that can be put inside of the larger live bait container to contain separate types or sizes of bait. This separate container is an option that can be used in combination (inside of the larger container) or by itself (outside of the larger bait container), and it has the same capability to selectively either float or sink depending upon the amount of trapped air inside of the container.
(g) A live bait container that can be tethered to a dock or boat, either while floating or submerged.
(h) A live bait container that is simple and easy to manufacture using common, inexpensive technology and materials.

This invention is a live bait container used to confine and transport live bait such as minnows, leaches or crawfish for fishermen. The live bait container has perforations or holes to allow the constant free exchange of water between the water inside of the live bait container and the fresh outside water to maintain a favorable environment to keep the bait healthy and lively. It also comprises an access door and a bait enclosure with at least one air chamber to provide buoyancy to float the live bait container in an upright position at the water surface with the major portion of the container below the water surface. It remains in this upright position when the bait container is stationary. There is a weight fixedly attached inside at the bottom of the bait enclosure near the back wall of the enclosure to maintain the container in an upright posture when it is stationery. However, when the container is being towed behind or beside a boat during trolling, this weight in combination with the air chamber and the tension of the tether will cause the container to float with its front wall and access door facing upward. The access door is sized and shaped to accommodate the users hand for convenient insertion or removal of bait. It can also accommodate the insertion or removal of a separate inner bait container optionally used to provide a separate smaller enclosure for different sizes or types of live bait, such as leaches or small minnows. The access door of the live bait container has a spring-biased hinge to keep the door closed during normal fishing activity to confine the live bait.

Typically, there will be two longitudinally positioned air chambers, one integrally formed with the bait enclosure, along each side of the bait enclosure. These air chambers are airtight, except each has a strategically placed hole or opening located near the bottom of the air chamber and passing through the back wall or side wall of the air chamber. This opening is provided to selectively allow air to be entered into the air chamber to provide floatation, or for water to be entered into the air chamber to submerge the live bait container. When the angler wants the live bait container to submerge, he/she pushes the container to the position shown in FIG. 4 whereby air will escape the air chamber and water will enter. With the air chambers filled with water the weight and density of the live bait container will be increased and it will submerge. When the user wishes to replace the water in the air chamber with air, he/she removes the live bait container from the water and places it in a generally upright position, and the water will then run out through the air chamber opening and be replaced with air to increase the buoyancy to allow the container to float. This air will be trapped within the air chamber until the angler wishes to submerge the live bait container.

Figure 8:
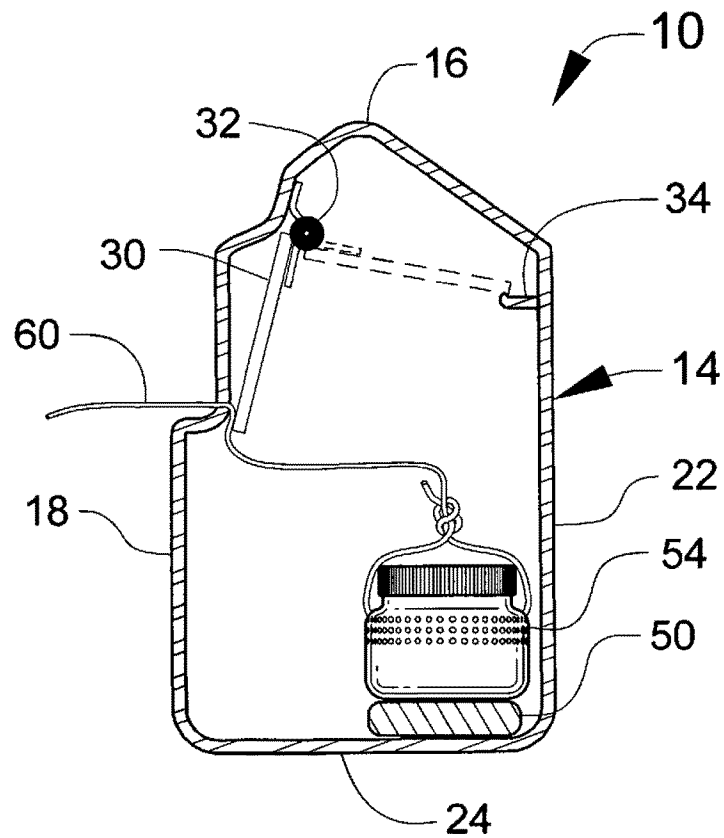

The optional inner bait container is a smaller enclosure and also has water portals or holes to allow the constant free exchange of water between the water inside of the inner bait container and the outside fresh water. The inner bait container can be used in combination with the larger live bait container by being inserted inside of the larger bait container as illustrated in FIG. 8. Or the live bait container and the inner bait container can be used separately. The inner bait container has a pocket of air trapped at its upper portion above the holes when it is in its normal upright position. This provides sufficient floatation for it to remain afloat at the water surface with the major portion of the container positioned below the surface. When the angler wants the inner bait container to sink, he/she turns it on its side, and the air will be expelled through the holes, and it will fill completely with water to allow it to sink. When the angler wants to reenter air, he/she removes the container from the water and places it in a generally upright position, and enough water will run out through the holes to replace the air in the upper portion of the container where the air pocket will be trapped to provide floatation for the container. The live bait container has a handle, and both containers have rope, cord or chain tethers for attaching the containers to a dock or boat. The containers are preferably made from plastic or other suitable materials.

The advantages of the invention are:
(a) The live bait container and the smaller inner bait container have numerous holes to provide for the constant free exchange of water between the water inside of the containers and the outside fresh water.
(b) The larger live bait container has an access door with a spring-biased hinge to allow easy insertion and extraction of bait by the angler. The smaller inner bait container has a top opening and removable lid for convenient access to insert or remove bait.
(c) The bait containers have sufficient buoyancy to remain afloat at the water surface during fishing activity, but can simply and easily be converted to sink by easily reducing the buoyancy for stowage below the buffeting action of waves and where the water temperature is cooler and the oxygen level is higher to maintain the bait in a lively, healthy condition. Thus, the bait container can be submerged without the angler having to gather rocks or other dense material to add weight and density to sink the container.
(d) The containers can simply and easily regain their buoyancy to return to a floating position by removing them from the water and placing them in an upright position so air will reenter to provide floatation.
(e) The containers provide the angler with easy access to the bait through the access door opening of the live bait container or through the lid opening of the inner bait container during fishing activity.
(f) The larger live bait container can have a separate smaller inner bait container that can be put inside of the larger container as an option that can be used in combination (inside of the larger container) or by itself (outside of the larger container), and it has the same capability to selectively either float or sink depending upon the amount of trapped air inside of the container.
(g) Both the larger live bait container and the smaller inner bait container have tethers so they can be secured to a dock or boat.
(h) Both containers are simple and easy to manufacture using common inexpensive technology and materials.

These and other objects, features, aspects, and advantages of the invention will become better appreciated and more clearly understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit and scope thereof, and the embodiments of the invention are intended to include all such modifications.

BRIEF DESCRIPTION OF THE DRAWINGS

FIG. 1 illustrates a perspective view of the front and bottom of the live bait container in a preferred form.

Figure 2:
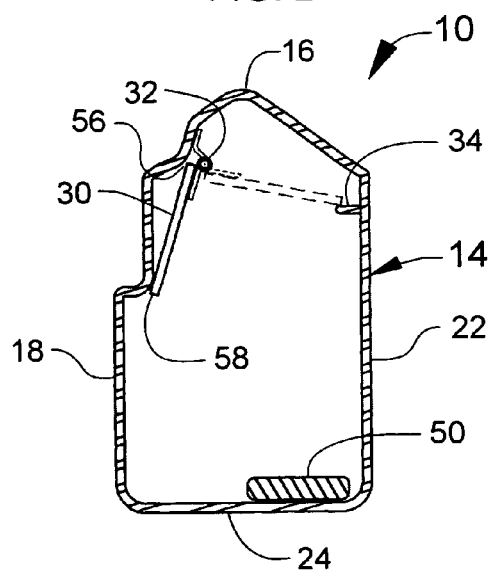
FIG. 2 is a side section view of the live bait container enclosure in an upright position.

FIG. 2 is a side section view of the live bait container enclosure in an upright position.

Figure 3:
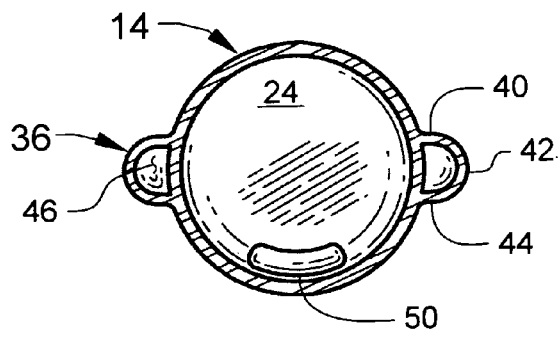
FIG. 3 illustrates a sectional view of the bottom of the live bait container enclosure.

FIG. 3 illustrates a sectional view of the bottom of the live bait container enclosure.

FIG. 4 is a perspective view of the invention with an air chamber being filled with water.

FIG. 5 is a perspective view of the invention in a floating position while trolling.

FIG. 6 is a perspective view of the invention in a normal upright floating position.

FIG. 7 is a perspective view of the invention in a submerged position.

FIG. 8 is a side sectional view of the live bait container enclosure with the optional inner bait container positioned inside of the live bait container enclosure.

Figure 9:
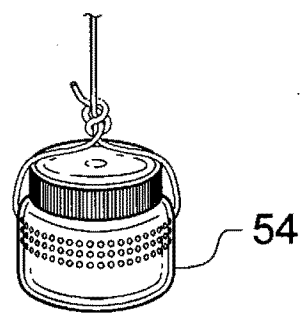

FIG. 9 illustrates a perspective view of the optional inner bait container.

Figure 10:
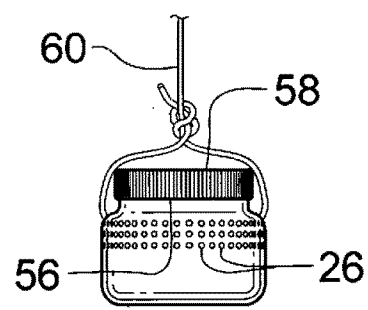

FIG. 10 is a side view of the optional inner bait container.

DRAWING REFERENCE NUMERALS OF THE ELEMENTS

|    | Element            |    | Element                       |
|----|--------------------|----|-------------------------------|
| 10 | container          | 36 | air chamber                   |
| 12 | handle             | 38 | air chamber top wall          |
| 14 | bait enclosure     | 40 | air chamber front wall        |
| 16 | top wall           | 42 | air chamber side wall         |
| 18 | front wall         | 44 | air chamber back wall         |
| 20 | side wall          | 46 | air chamber bottom wall       |
| 22 | back wall          | 48 | air chamber opening           |
| 24 | bottom wall        | 50 | weight                        |
| 26 | holes              | 52 | container tether              |
| 28 | access opening     | 54 | inner container               |
| 30 | access door        | 56 | inner container access opening|
| 32 | spring-biased hinge| 58 | inner container lid           |
| 34 | door catch         | 60 | inner container tether        |

DETAILED DESCRIPTION OF THE INVENTION

The examples used herein are intended merely to facilitate an understanding of the ways in which the various embodiments of the invention may be practiced and to further enable those having skill in the art to practice the concepts of the invention. Accordingly, the examples given should not be construed as limiting the scope of the invention.

In describing the invention, expressions such as "top," "bottom," and "side," refer to the position when the live bait container 10 is in its generally upright or vertical attitude. With reference to the drawings, and wherein like numerals designate like parts, FIG. 1 illustrates a live container 10 primarily for maintaining aquatic live fishing bait, such as minnows, leaches or crawfish in a lively, healthy condition during fishing activity or during intervals of stowage between fishing activities. Container 10 may also be used to contain non-aquatic bait. Container 10 comprises a handle 12, a bait housing or enclosure 14 adapted to prevent the bait from escaping, at least one air chamber 36 to provide variable buoyancy, an access door 30, normally urged in a closed position by a spring-biased hinge 32, a bait container access opening 28, a permanently affixed weight 50 to facilitate the correct floating orientation of container 10 during trolling, a container tether 52, and an optional smaller inner container 54 to provide a separate enclosure for different sizes or types of live bait from that in the primary container 10.

Handle 12 is typically configured in an inverted U-shape and sized to be conveniently gripped by the user to lift or carry container 10. It can also be used as a connection point to anchor or tow container 10 as shown in FIGS. 5, 6 and 7. It can be made of plastic or similar suitable materials, and can be designed to be retractable for the purpose of minimizing space. Enclosure 14 comprises a generally conical shaped top wall 16, a front wall 18, at least one side wall 20, a back wall 22, a generally flat bottom wall 24, and an access opening 28, all integrally formed to provide an escape-proof bait enclosure for the live bait. The function of walls 16, 18, 20, 22, and 24 is to define the hollow bait enclosure 14. Bait enclosure 14, with its elements, is preferably integrally formed and molded from plastic or made from other similar suitable materials, such as fiberglass, metal or carbon. The upper and lower portions of bait enclosure 14 can be formed in relatively simple molds and joined together along a sealing seam. Bait enclosure 14 may be frustoconical, cylindrical, rectangular, or one of a number of different shapes. Access opening 28 and its matching access door 30 are positioned in bait enclosure front wall 18 near the top of bait enclosure 14 and are sized and shaped to facilitate convenient access for a user to insert his/her hand to insert or retrieve bait.

Access door 30 is attached at its upper edge to the upper edge of access opening 28 by spring-biased hinge 32, and is normally held in a closed position by spring-biased hinge 32 to confine the bait. Access door 30, in its closed position, serves as a barrier to prevent the bait from escaping from bait enclosure 14. Access door 30 is preferably made from plastic or other suitable materials and may have water portals or holes 26 to enhance the free exchange of water between the water inside of bait enclosure 14 and outside fresh water. Holes 26 are sufficiently small to confine the bait, but large enough to provide the constant free exchange of water. Holes 26 also allow the outflow of excess water when container 10 is removed from the water body.

It can be seen from FIG. 1 that container 10 is adapted to contain a volume of water even when stored outside of the water body. Holes 26 are also provided in the inner container 54 and may be provided in the walls 18, 20, and 22 of bait enclosure 14. Spring-biased hinge 32 is made of steel or other suitable material with a spring sufficiently strong to maintain the access door in a normally closed position, yet allow the user to easily push access door 30 open to insert a hand to extract bait. A latch or door catch 34 is provided as an inward projection or stud fixedly attached to the inside of bait enclosure back wall 22 of bait enclosure 14. It is provided so the user can easily open access door 30 by hand and frictionally engage the bottom edge of access door 30 against the top surface of door catch 34 to temporarily hold access door 30 in the open position. Access door 30 will remain held in the open position until the user pulls access door 30fr away from door catch 34 to allow spring-biased hinge 32 to reclose access door 30 to confine the bait. In this manner, access door 30 can be conveniently kept open while live bait is being entered into bait enclosure 14. When the angler wants to release door 30 to allow spring-biased hinge 32 to reclose the door, he/she pulls the lower edge of the door away from door catch 34, and access door 30 will close and remain in a closed position until urged open again by the angler. Door catch 34 is preferably formed of the same material as bait enclosure 14.

A weight 50 is permanently affixed to bait enclosure bottom wall near bait enclosure back wall 22 inside of bait enclosure 14. Weight 50 is composed of metal or other dense material having a specific gravity of greater than 1, and is sized and positioned to hold container 10 in a substantially upright position when floating stationary as shown in FIGS. 6 and 7, but allow container 10 to reside in a nearly horizontal position with access door 30 facing upward when towed by container tether 52 during trolling activity as shown in FIG. 5. Container tether 52 is a rope, cord or chain of nylon, plastic, hemp, metal or other suitable material of sufficient strength and durability to tow or suspend container 10 during fishing activity or when container 10 is suspended.

One or more longitudinally positioned air chambers 36 is arranged to provide sufficient buoyancy to maintain container 10 in its normal upright position afloat at the water surface while the major portion of container 10 is submerged. Typically, air chamber 36 is made of the same plastic or similar material as bait enclosure 14 and is molded and integrally formed with bait enclosure 14. Air chamber 36 comprises air chamber top wall 38, air chamber front wall 40, at least one air chamber side wall 42, air chamber back wall 44, air chamber bottom wall 46, and air chamber opening 48. The function of walls 38, 40, 42, and 44 is to define a hollow air chamber 36. Air chamber 36 is a hollow, longitudinally positioned, airtight enclosure, except for air chamber opening 48. Typically, a pair of air chambers 36 can be positioned, one alongside each side of bait enclosure 14, as shown in FIG. 1.

Air chamber opening 48 must be located close to the bottom of air chamber 36 and go through the air chamber side wall 42 or air chamber back wall 44. When opening 48 is located in this position, air will not escape from air chamber 36 when container 10 is in any of its normal or near-normal positions shown in FIGS. 5, 6, and 7. However, air can purposely be released from air chamber 36 by the user by placing container 10 in the forced unstable position shown in FIG. 4, causing air to be expelled through air chamber opening 48, and out of air chamber 36, thus allowing water to enter to cause the total weight and density of container 10 to increase sufficiently to cause container 10 to sink.

When the user desires to regain buoyancy, the user can remove container 10 from the water body and place it in a generally upright position, and the water in air chamber 36 will simply run out of air chamber 36 through opening 48. Water will not reenter air chamber 36 unless the user again forces the air out of air chamber 36 by pushing live bait container 10 into the position shown on FIG. 4. For suitable performance, air chamber opening 48 should be a hole in the range of approximately 3/8 inch to 1 ¼ inch in diameter. Opening 48 can also be non-circular of similar area. This simple addition of only one air chamber opening 48, strategically placed on each air chamber 36, allows the angler to selectively alternate between a floating or sinking container 10 with very little effort.

An inner bait container 54 can be used in combination with container 10, or each can be used separately. Inner container 54 is an enclosure to separately confine live bait such as leaches, small minnows or crayfish. It is sized and shaped to fit through access opening 28 of the larger bait enclosure 14, and has an inner container tether 60 to be used to facilitate extraction of inner container 54 from the larger bait enclosure 14 or for attachment to a boat or dock. Inner container tether 60 is a rope, cord or chain of nylon, plastic, hemp, metal or other suitable material of sufficient strength and durability to tow or suspend inner container 54 during fishing activity or when inner container 54 is suspended for storage. Inner container 54 has numerous water portals or holes 26 to provide for the constant free exchange of water with the outside lake or river water. Holes 26 are large enough to permit the constant free exchange of water between the water inside of inner container 54 and outside fresh water, but small enough to prevent the escape of the live bait. An inner container access opening 56 and inner container lid 58 are provided to allow the user to access the inside of inner container 58 to insert or remove bait. Inner container 54 and its removable lid 58 are preferably molded from plastic or other similar suitable materials. The upper portion of inner container 54 normally serves as an air pocket to provide floatation, unless the user turns inner bait container on its side to allow this air to exit through holes 26, whereby inner container 54 will lose its buoyancy and then can submerge below the water surface. Holes 26 are positioned low enough on the sides of inner container 54 to maintain an air pocket in the upper portion of inner container 54 when inner container 54 is in an upright or near-upright position as can be seen in FIG. 10.

OPERATION AND USE OF THE INVENTION

An angler can use container 10 and inner container 54 in combination as illustrated in FIG. 8, or each can be used separately. Each has sufficient buoyancy to float during normal fishing activity, but can be selectively made to sink by forcing them into an unstable position as shown in FIG. 4 to allow air to escape to decrease their buoyancy. Container 10 normally floats in its upright position as shown in FIG. 6 or with bait enclosure front wall 18 and access door 30 facing upward during trolling as shown in FIG. 5. During trolling, container 10 will float with bait enclosure front wall 18 facing upward because of the positioning of weight 50 at the bottom of bait enclosure 14 and near the bait enclosure back wall. The user can remove air from air chamber 36 by forcing live bait container 10 into a submerged position with bait enclosure back wall 22 and air chamber opening 48 facing upward as shown in FIG. 4, allowing air chamber 36 to release air and take on water, thus allowing container 10 to submerge. When the user chooses to regain buoyancy, he/she can simply remove container 10 from the water body and place it in a generally upright position, and the water will run out of air chamber 36 through air chamber opening 48. Water will not reenter air chamber 36 unless the user chooses to add water by placing container 10 into the position shown in FIG. 4.

Inner container 54 can be used in the same manner as container 10. The upper portion serves as an air pocket with trapped air providing buoyancy during normal fishing activity, with inner container 54 in a generally upright posture. When the user chooses to allow it to submerge, he/she turns inner container 54 on its side to remove the air through holes 26 in its side. When the user decides to regain buoyancy, he/she removes inner container 54 from the water body and places it in an upright position. Enough water will run out through the holes 26 of inner container 54 to replace the air in the upper portion of inner container 54 to reestablish the trapped air pocket to provide sufficient buoyancy for floatation

CONCLUSION

It should be understood that the phraseology or terminology employed herein is for purposes of description and not of limitation. Workers skilled in the art will recognize additions, deletions, and other modifications that can be made in form and detail without departing from the spirit and scope of the invention. Thus, the scope of the invention should be determined by the appended claims, and not by the specific examples given.

From the above-described features, it can be seen that this invention is unique and has a number of significant advantages over the prior art. It is inexpensive to manufacture, simple, and easy to use. A user can easily convert it from a floating container to a sinking container by simply placing the unit in a particular position to allow air to escape the air chamber. Conversely, it can be returned to a floating unit by removing the container from the water body and placing it in a generally upright position so the water will run out through the air chamber opening in the air chamber back wall. Only one air chamber opening is required in each air chamber, and plugs or stoppers are not required to open or close the opening in the air chamber side wall or back wall. With this convenient feature, the angler can easily submerge the container to avoid the buffeting action of waves, and place the container below the water surface where temperature and oxygen levels are more favorable to maintain the bait in a lively, healthy environment. When the angler wants to resume fishing, he/she can easily return the container's buoyancy by allowing the water to run out of the air chamber. The optional inner bait container provides the capability to provide a separate containment for different sizes and types of bait, such as leaches or small minnows. It also can be easily converted from a floating container to a sinking container. Clearly, this invention is well adapted to meet the conditions of practical use, and it should be evident that it provides many advantages, is novel, and is worthy of patentable merit over the prior art.